(12) United States Patent
Naikal et al.

(10) Patent No.: US 9,665,777 B2
(45) Date of Patent: May 30, 2017

(54) SYSTEM AND METHOD FOR OBJECT AND EVENT IDENTIFICATION USING MULTIPLE CAMERAS

(71) Applicant: Robert Bosch GmbH, Stuttgart (DE)

(72) Inventors: Nikhil Naikal, New York, NY (US); Pedram Lajevardi, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 14/273,653

(22) Filed: May 9, 2014

(65) Prior Publication Data

US 2014/0333775 A1 Nov. 13, 2014

Related U.S. Application Data

(60) Provisional application No. 61/822,051, filed on May 10, 2013.

(51) Int. Cl.
G06K 9/48 (2006.01)
G06K 9/00 (2006.01)
H04N 7/18 (2006.01)
H04N 21/218 (2011.01)
H04N 21/44 (2011.01)

(52) U.S. Cl.
CPC ...... *G06K 9/00771* (2013.01); *G06K 9/00711* (2013.01); *H04N 7/181* (2013.01); *H04N 21/21805* (2013.01); *H04N 21/44008* (2013.01); *G06K 2009/00738* (2013.01)

(58) Field of Classification Search
CPC .. H04N 19/139; H04N 19/172; H04N 19/176; H04N 19/61

USPC .................................................. 375/240.02
See application file for complete search history.

(56) References Cited

U.S. PATENT DOCUMENTS

| 2003/0093810 | A1 | 5/2003 | Taniguchi |
| 2008/0211907 | A1 | 9/2008 | Kelly et al. |
| 2010/0272366 | A1 | 10/2010 | Meng et al. |
| 2011/0019003 | A1* | 1/2011 | Asa et al. .......... G06K 9/00221 348/159 |

(Continued)

FOREIGN PATENT DOCUMENTS

KR 10-2012-0130936 A 12/2012

OTHER PUBLICATIONS

Weinland, Daniel et al., Motion History Volumes For Free Viewpoint Action Recognition, Project MOVI, INRIA Rhone Alpes, Montbonnot Saint Martin, France, Published at least as early as May p, 2013.

(Continued)

*Primary Examiner* — Nguyen Truong
(74) *Attorney, Agent, or Firm* — Maginot Moore & Beck LLP (57) ABSTRACT

A system for identifying objects and events of interest uses one or more cameras with image processing capabilities. The system is includes multiple cameras configured to perform image processing of a scene from multiple angles to extract and transmit meta-data corresponding to objects or people in the scene. The cameras transmit the meta-data to a processing station that is configured to process the stream of data over time to detect objects and events of interest to alert monitoring personnel of objects or events in the scene.

16 Claims, 6 Drawing Sheets

(56) References Cited

U.S. PATENT DOCUMENTS

| | | | | |
|---|---|---|---|---|
| 2012/0274776 | A1* | 11/2012 | Gupta et al. | G08B 13/19641 348/159 |
| 2012/0293686 | A1 | 11/2012 | Karn et al. | |
| 2012/0300081 | A1* | 11/2012 | Kim | G08B 13/19656 348/159 |

OTHER PUBLICATIONS

Naiel, Mohammed A. et al., Multi-view Human Action Recognition System Employing 2DPCA, Published at least as early as May 9, 2013.

Wu, Chen et al., Multiview Activity Recognition in Smart Homes with Spatio-Temporal Features, Published at least as early as May 9, 2013.

Poppe, Ronald, A Survey on Vision-Based Human Action Recognition, Image and Vision Computing, 2010, vol. 28, pp. 976-990.

Aggarwal, J.K., Human Activity Analysis: A Review, ACM Computing Surveys, Published at least as early as May 9, 2013.

Poseidon Computer Aided Drowning Detection, http://www.poseidonsaveslives.com/, Published at least as early as May 9, 2013.

Brickstream, http://www.brickstream.com/, Published at least as early as May 9, 2013.

Aimetis, "Introducing the Aimetis A10D Thin Client," http://www.aimetis.com/, Published at least as early as May 9, 2013.

Briefcam, http://briefcam.com/, Published at least as early as May 9, 2013.

Check Video by Cernium, https://www.checkvideo.com/video-surveillance-products/video-surveillance-software/, Published at least as early as May 9, 2013.

Cognimatics, http://www.cognimatics.com/, Published at least as early as May 9, 2013.

Evitech, http://www.evitech.com/, Published as least as early as May 9, 2013.

Equinox Sensors, http://www.equinoxsensors.com/, Published at least as early as May 9, 2013.

Genetec, http://www.genetec.com/, Published at least as early as May 9, 2013.

Honeywell, http://www/honeywellvideo.com/products/ias/index.html, Published at least as early as May 9, 2013.

Imagemetry, http://imagemetry.com/, Published at least as early as May 9, 2013.

IntelliVision, http://www.intelli-vision.com/, Published at least as early as May 9, 2013.

ObjectVideo, http://www.objectvideo.com/, Published at least as early as May 9, 2013.

Vitamin D, http://www.sighthound.com/, Published at least as early as May 9, 2013.

Naikal, Nikhil, Allen Y. Yang, and S. Shankar Sastry. "Towards an efficient distributed object recognition system in wireless smart camera networks." in Information Fusion (FUSION), 2010 13th Conference on, pp. 1-8. IEEE, 2010.

Jacques, J. C. S., Jung, C. R., & Musse, S. R. (Oct. 2005). Background subtraction and shadow detection in grayscale video sequences. In Computer Graphics and Image Processing, 2005. SIBGRAPI 2005. 18th Brazilian Symposium on (pp. 189-196). IEEE.

Horprasert, T., Harwood, D., & Davis, L. S. (Sep. 1999). A statistical approach for real-time robust background subtraction and shadow detection. In IEEE ICCV (vol. 99, pp. 1-19).

Dalal, N., & Triggs, B. (Jun. 2005). Histograms of oriented gradients for human detection. In Computer Vision and Pattern Recognition, 2005. CVPR 2005. IEEE Computer Society Conference on (Vol. 1, pp. 886-893). IEEE.

Papageorgiou, C., & Poggio, T. (2000). A trainable system for object detection. International Journal of Computer Vision, 38(1), 15-33.

International Search Report and Written Opinion corresponding to PCT Application No. PCT/US2014/037449, mailed Sep. 1, 2014 (13 pages).

\* cited by examiner

Figure 6 – Fully connected field graphical model

SYSTEM AND METHOD FOR OBJECT AND EVENT IDENTIFICATION USING MULTIPLE CAMERAS

CLAIM OF PRIORITY

This application claims priority to U.S. Provisional Application No. 61/822,051, which is entitled "SYSTEM AND METHOD FOR OBJECT AND EVENT IDENTIFICATION USING MULTIPLE CAMERAS," and was filed on May 10, 2013, the entire contents of which are hereby incorporated by reference herein.

TECHNICAL FIELD

This disclosure relates generally to the field of video monitoring, and, more particularly, to systems and methods for monitoring objects and events using multiple cameras arranged at different angles around a scene.

BACKGROUND

Video monitoring systems are widely deployed for various purposes, which include security and public safety. In a typical video monitoring system, one or more cameras are deployed in different locations to monitor activities. For example, video monitoring systems generate images of public places, transportation facilities, retail stores, industrial facilities, and residences and other private property. The monitoring systems often include data storage devices that archive some or all of the recorded video for later review, and one or more video output devices that enable playback of live and archived video data.

In some monitoring systems, the cameras generate video data that are monitored by one or more human operators who can view activity in the video and take appropriate action if they view an incident. For example, in a monitoring system at a retail store, the operator views live video of individuals in the store and alerts security personal if an individual attempts to shoplift merchandise. In some video monitoring systems, multiple cameras record video of a single scene from different positions and angles. While producing video from multiple angles can be helpful in collecting additional detail about a scene, the multiple video recordings are difficult for a human operator to observe in an efficient manner. Additionally, in networked video monitoring systems, multiple video streams consume large amounts of bandwidth and network resources, particularly in wireless video monitoring systems. Consequently, improvements to video monitoring systems that identify events of interest in recorded video data in an automated manner and that utilize network bandwidth in an efficient manner would be beneficial.

SUMMARY

A video surveillance system includes distributed cameras that communicate with a central processing station. The central processing station communicates with multiple cameras that extract foreground objects using background subtraction methods. The cameras in our system transmit metadata to the central processing station. The metadata corresponding to humans are filtered from that corresponding to other objects. The foreground metadata corresponding to people is analyzed by the central processing station to recognize motions and events that are performed by people. The cameras communicate with the central processing station using wireless communication network or other suitable communication channels.

In one embodiment, the video surveillance system includes a plurality of cameras located in a plurality of positions to record a scene. Each camera includes a sensor configured to generate video data of the scene comprising a series of frames, a first network device configured to transmit the video data and feature vectors associated with the video data to a processing station, and a feature extraction processor operatively connected to the sensor and the network device. The feature extraction processor is configured to identify a plurality of feature vectors in video data generated by the sensor, transmit only the plurality of feature vectors to the processing station with the first network device in a first operating mode, and transmit the video data to the processing station with the first network device in a second operating mode only in response to a request for the video data from the processing station. The video surveillance system further includes a processing station having a second network device, a video output device, and a processor operatively connected to the second network device and the video output device. The processor is configured to receive the plurality of feature vectors generated by each camera in the plurality of cameras with the second network device, identify an object and motion of the object in the scene with reference to the plurality of feature vectors received from at least two of the plurality of cameras, identify an event corresponding to the motion of the object in the scene with reference to a predetermined database of events, generate a request for transmission of the video data from at least one camera in the plurality of cameras, and generate a graphical display of the video data from the at least one camera with the video output device to display the object associated with the event.

In another embodiment, a method for performing surveillance of a scene has been developed. The method includes generating with a sensor in a first camera first video data of the scene, the first video data comprising a first series of frames, identifying with a feature extraction processor in the first camera a first plurality of feature vectors in the first video data, transmitting with a network device in the first camera only the first plurality of feature vectors to a processing station in a first operating mode, transmitting with the network device in the first camera the first video data to the processing station in a second operating mode only in response to a request for the first video data from the processing station, generating with another sensor in a second camera second video data of the scene, the second video data comprising a second series of frames and the second camera generating the second video data of the scene from a different position than the first camera, identifying with another feature extraction processor in the second camera a second plurality of feature vectors in the second video data, transmitting with another network device in the second camera only the second plurality of feature vectors to the processing station in the first operating mode, transmitting with the other network device in the second camera the second video data to the processing station in the second operating mode only in response to a request for the second video data from the processing station, receiving with another network device in the processing station the first plurality of feature vectors from the first camera and the second plurality of feature vectors from the second camera, identifying with an event processor in the processing station an object and motion of the object in the scene with reference to the first and second plurality of feature vectors, identifying with the event processor in the processing station an event corresponding to the motion of the object in the scene with reference to a predetermined database of events, generating with the event processor in the processing station a request for transmission of the video data from at least one of the first camera and the second camera, and generating with a video display device a graphical display of video data received from at least one of the first camera and the second camera with the video output device to display the object associated with the event.

DETAILED DESCRIPTION

For the purposes of promoting an understanding of the principles of the embodiments described herein, reference is made to the drawings and descriptions in the following written specification. No limitation to the scope of the subject matter is intended by the references. The description also includes any alterations and modifications to the illustrated embodiments and includes further applications of the principles of the described embodiments as would normally occur to one skilled in the art to which this document pertains.

As used herein, the term "scene" depicts a single area that is monitored by a surveillance system using multiple cameras that are located at multiple positions to view the scene from different directions. Examples of scenes include, but are not limited to, rooms, hallways, concourses, entry and exit ways, streets, street intersections, retail stores, parking facilities and the like.

As used herein, the term "sparse encoding" refers to a method for generating data corresponding to a large number of inputs that are encoded as vectors using a plurality of "basis vectors" and "sparse weight vectors." The basis vectors are generated using a penalized optimization process applied to a plurality of predetermined input vectors that are provided during a training process. In one embodiment, a $l_1$ optimization process that is known to the art is used to generate the basis vectors and sparse weight vectors that correspond to a plurality of input training vectors. The term "sparse" used to refer to a vector or matrix describes a vector or matrix having a plurality of elements where a majority of the elements are assigned a value of zero. As used herein, the term "dimensionality" as applied to a vector refers to a number of elements in the vector. For example, a row or column vector with three elements is said to have a dimensionality of three, and another row or column vector with four elements is said to have a dimensionality of four.

As used herein, the term "metadata" refers to properties of objects that are identified in video or other sensor data. For example, if an object follows a path through a field of view of a video camera, the metadata corresponding to the object optionally include the two-dimensional position of the object in the frames of video data, a velocity of the object, a direction of movement of the object, a size of the object, and a duration of time that the object is present in the field of view of the camera. As described below, events are identified with reference to the observed metadata of an object. The metadata do not require that an object be identified with particularity. In one embodiment, the metadata do not identify that an object is a particular person, or even a human being. Alternative embodiments, however, infer that metadata correspond to a human if the event is similar to an expected human action, such metadata of an object moving at a direction and speed that correspond to a human walking past a camera. Additionally, individual objects are only tracked for a short time and the metadata do not identify the same object over prolonged time periods. Thus, the stored metadata and identification of high-interest events due to metadata do not require the collection and storage of Personally Identifiable Information (PII) beyond storage of video data footage for later retrieval.

As used herein, the terms "feature vector" or more simply "feature" refer to vectors of metadata that correspond to a distinguishing structure in an object that is identified in video data of the object. Each element of the metadata is also referred to as a "feature descriptor" and a feature vector includes a plurality of feature descriptors. For example, the approximate shape of a human body or portions of the human body such as arms and legs is identified in video data. The human body is distinct from the surrounding environment, and a feature vector includes data that describe aspects of the human body in the video data including, for example, the size, location, and orientation of the object in the scene. If the video data include multiple humans, then each human can be described using a single feature vector, or each human can be described using multiple feature vectors for different body parts such as the arms, legs, torso, etc.

As used herein, the term "dictionary" refers to a plurality of basis vectors that are generated using the sparse encoding process. After the dictionary is generated during the training process, the basis vectors in the dictionary are used to identify a degree of similarity between an arbitrary input vector and the input vectors that were used to generate the basis vectors in the dictionary during the training process. An optimization technique is used to select combinations of basis vectors using a sparse weight vector to generate a reconstructed vector that estimates the arbitrary input vector. An identified error between the reconstructed estimate vector and the actual input vector provides a measure of similarity between the input vector and the dictionary.

As used herein, the term "key-frame" refers to an image frame in a video sequence of a motion performed by a person or other object in a scene that is considered to be representative of the overall motion. A video sequence of a motion typically includes two or more key-frames, and a training process that is described in more detail below includes identification of a limited number of N key-frames in the video sequence. Each video sequence of a particular event includes the same number of N key-frames, but the time at which each key-frame occurs can vary depending upon the angle of the video sequence and between different video sequences that are used as training data. An event of interest that is recorded from one or more angles during a training process includes a series of frames of video data.

For example, a video sequence that depicts a person standing up from a sitting position is an event Annotators identify key-frames in the video sequence of the person standing in the video streams from multiple cameras that are positioned around the person. An event processor or another suitable processing device then extracts features from the identified key-frames to identify a sequence of feature vectors corresponding to the event. A training set of multiple video sequences that depict the same event performed by one or more people or objects from different viewing angles form the basis for selecting key-frames in each of the video sequences. The features that are extracted from the key-frames selected in video sequences in the training data form the basis for the dictionary that is incorporated into a database for the identification of similar motions performed by other people or objects in different scenes that are monitored by a video surveillance system.

As used herein, the term "synchronization frame" refers to a frame of video data that is generated in a camera and that contains features that are extracted by a feature extraction processor in the camera to form a full feature vector. A full feature vector includes all of the data corresponding to the identified features in the frame of video data. As an object, such as a human, moves through a scene, the video data in subsequent image frames captures the movement, and the feature extraction processor generates sparse feature vectors that include only changes in the identified feature relative to previous frames that include the feature, such as the synchronization frame. In some embodiments, video cameras generate synchronization frames at regular intervals (e.g. once every 60 frames of video data). Feature vector extraction techniques that are known to the art include, but are not limited to, dimensionality reduction techniques including principal component analysis, edge detection, and scale-invariant feature transformations. In some embodiments, an identified object in a scene is encoded with a Histogram of Oriented Gradients (HOG) appearance feature descriptor. As described above, the key-frames of video data occur at particular times during an event of interest and are not necessarily aligned with the generation of synchronization and intermediate frames during operation of a camera. Consequently, a key-frame of video data that is generated during an event of interest can be captured with a synchronization frame or intermediate frame in a camera.

Figure 1:
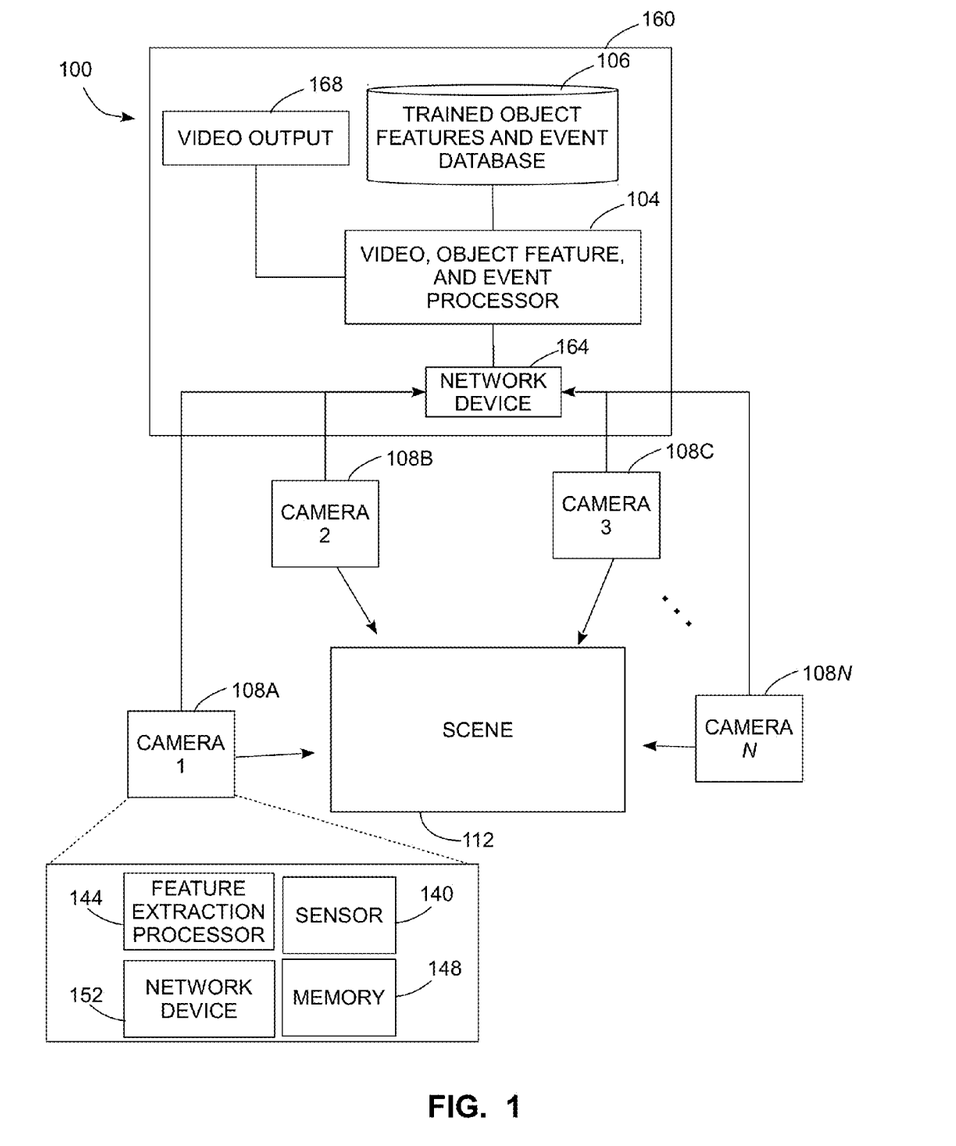
FIG. 1 is a schematic diagram of a video monitoring system.

FIG. 1 depicts a video monitoring system 100 that is configured to record video data about objects in a scene and to display selected video for additional analysis by human operators. The video monitoring system 100 includes a processing station 160 and a plurality of cameras 108A-108N that are each positioned to record a scene 112 from different locations and angles. The processing station 160 further includes a video, object feature, and event processor 104, object and feature database 106, network device 164, and a video output device 168. In the embodiment of FIG. 1, the network device 164 is a wired or wireless data networking adapter, and the video output device 168 includes one or more display screens, such as LCD panels or other suitable video display devices.

In the video monitoring system 100, the feature processor 104 in the processing station 160 includes one or more digital processors such as central processing units (CPUs), graphical processing units (GPUs), digital signal processors (DSPs), application specific integrated circuits (ASICs), and the like that are configured to execute stored program instructions to process both feature and event data that are received from the cameras as well as video data that are received from the cameras. The processor 104 further includes one or more memory devices that store programmed instruction data for execution of one or more software programs with the processor 104. The processor 104 is operatively connected to the database 106, network device 164, and video output device 168. During operation, the processing station 160 receives feature vector data and optionally video data from the cameras 108A-108N with the network device 164. The processor 104 in the processing station 160 identifies objects of interest and events of interest through synthesis of the feature vector data from one or more of the cameras 108A-108N in conjunction with predetermined feature vectors and event data that are stored in that are stored in the trained object features and event database 106.

The trained object features and event database 106 stores the dictionary of the training data. The training data are generated during a training phase for the system 100, and the feature basis vectors in the dictionary for key-frames that correspond to different portions of an event are typically not generated from the same objects that move through the scene 112 and are often recorded by a different set of cameras in a location other than the scene 112. As described below, the system 100 removes the background of the scene and rescales identified objects to identify feature vectors for new objects in the scene 112 that are independent of the particular features of the scene 112 and are not overly dependent upon the characteristics of an individual person or object that was not part of the training process. Thus, in the system 100 the event processor 104 uses the stored dictionary of feature vectors in the database 106 to identify events based on the motion of objects that were not used during the training process in scenes that correspond to locations other than the location used during the training process.

The trained object features and event database 106 stores data corresponding to a plurality of predetermined features that are associated with previously identified objects and sequences of feature movements that are associated with previously identified events. For example, the database 106 stores feature vector data corresponding to the identified shapes of humans and other objects that are present in the scene 112 and are recorded by the video cameras 108A-108N. The feature data can include the same feature as viewed from different angles and positions around the scene in the angles corresponding to the viewing angles and positions of the video cameras 108A-108N. The even data include predetermined sequences of movements for one or more identified features of one or more objects in the scene. For example, the event data in the database 106 can include a sequence of features that correspond to a person who is walking. Another person who walks through the scene 112 exhibits similar features. The features change as the legs and other body parts of the person move while walking. The database 106 is implemented using one or more non-volatile and volatile digital data storage devices including, but not limited to, magnetic hard drives, optical drives, solid state storage devices, static and dynamic random access memory (RAM) devices, and any other suitable digital data storage device.

In the video monitoring system 100, the cameras 108A-108N record video image data of the scene 112, identify feature data corresponding to objects in the recorded video, and transmit a portion of the feature data and video data to the event processor 104. Using camera 108A as an example, each of the cameras includes a sensor 140, a feature extraction processor 144, memory 148, and a network device 152. The sensor 140 includes one or more sensing elements such as a charge-coupled devices (CCDs) or complementary metal oxide semiconductor (CMOS) image sensors that record video of the scene 112, and the sensor 140 is configured to generate digital image data from the scene 112 in, for example, monochrome, color, or near-infrared. In another embodiment the camera includes an infrared sensor for detecting images in the far infrared frequency band. In some embodiments the sensor 140 is further integrated with lenses, mirrors, and other camera optical devices that are known to the art. The feature extraction processor 144 includes one or more digital processors such as central processing units (CPUs), graphical processing units (GPUs), digital signal processors (DSPs), application specific integrated circuits (ASICs), and the like that are configured to execute stored program instructions to process image data from the sensor 140 and to identify feature vectors for one or more objects in the scene 112 using one or more feature extraction techniques. The memory 120 stores program instructions for the feature extraction processor 144 and optionally stores a buffer of video data that the sensor 140 generates during operation of the camera in the memory 148. As described below, the processing station 160 optionally generates a request for buffered video data in response to identifying that one of the cameras 108A-108N has recorded an event. In one embodiment, the network devices 152 in the cameras 108A-108N transmit data to the corresponding network device 164 in the processing station 160 through a wireless data network such as, for example, a wireless local area network (WLAN) or wireless wide area network (WWAN).

In many data networks, including wireless networks, the bandwidth required to transmit all recorded video data and other data including extracted feature data from each camera to the event processor 104 in the processing station 160 requires large amounts of network bandwidth. The cameras 108A-108N optionally include visible, near-infrared or far-infrared illumination sources and the cameras include image intensifiers for low-light operation in some embodiments.

Each one of the cameras 108A-108N includes the feature extraction processor 144 to perform image processing and feature extraction processing. As described in more detail below, the cameras 108A-108N transmit full feature vector data for objects in the video in synchronization frames that are transmitted at regular intervals. The feature data include data vectors that describe one or more features for objects in video data that are generated in each frame. As described above, the synchronization frame is a frame of video data where a processor in the camera generates full feature data for each feature identified in the frame of video data. Synchronization frames are generated at regular intervals during operation of the camera, and frames of video data that are generated between synchronization frames are referred to as intermediate frames. During each intermediate frame of video data, the camera only transmits updates to features using a sparse feature encoding scheme to greatly reduce the amount of data and bandwidth requirements for transmitting updates to the feature vectors to the event processor 104.

The event processor 104 in the processing station 160 optionally requests full video data from one or more of the cameras 108A-108N during operation. For example, in response to identification of an even, the processor 104 requests video data from one or more of the cameras 108A-108N and the video output device 168 displays the video for an operator to review. The operator optionally generates additional requests for video from one or more of the other cameras 108A-108N. Thus, in one mode of operation a subset of the cameras 108A-108N transmit full video data to the processor 104, while other cameras only transmit the feature data and feature update data. As described above, the memory 120 in each of the cameras 108A-108N include an internal data storage device that is configured to buffer video data for a predetermined time period to enable the processor 104 to request additional video data that are stored in the camera. For example, the memory 120 in the camera 108B includes a digital data storage device that holds a buffer of the previous 10 minutes of recorded video for the scene 112. The camera 108B generates and transmits feature vector data for objects that are present in the scene 112, including moving objects, and transmits the feature vector data to the processor 104. If an event of interest occurs in the scene 112, the operator of the processor 104 requests the full video data corresponding to an identified time during which the event occurs and the camera 108B retrieves the requested video from the data storage device. Thus, even though the camera 108B does not transmit full video data to the processor 104, the processor 104 optionally retrieves video data for selected events of interest in the system 100.

In the system 100, the database 106 includes the trained models that are used to identify occurrences of events of interest from the feature vector metadata that the cameras 108A-108N transmit to the central processing station 160. Training is performed before the system 100 is used to perform surveillance on a scene, and the training process is often performed under controlled conditions at a different location than the location of the scene 112. In one embodiment, the central processing station 160 and event processor 104 are configured to perform the training process, while in another embodiment a separate computing system performs the training process and data from the training process are stored in the trained object features and event database 106 for use during operation of the system 100.

The training process includes a series of trials where a humans or other object perform motions that correspond to events of interest, and the motions are recorded as video from multiple viewing angles. A manual annotation process includes one or more annotators who select a limited number of key-frames from each of the video sequences to assist in generating a trained model for the human or object movements that occur in each event of interest. In one embodiment, the process of manual selection for key-frames during training includes an easy to use interface. This process is simplified to be done by a mechanical turk worker. The instructions presented to turk-workers for annotating the data to obtain key-frames. While the training process for selecting key-frames is performed manually in one embodiment, the feature extraction process and additional generation of the training dictionary data are performed in an automated manner without human intervention.

For example, in one embodiment a digital processing device receives key-frames of video data from multiple video sequences of a particular event of interest in the training data. In one configuration, the multiple video sequences include videos taken from different positions and angles of a single person or object performing a single motion in an event of interest. The multiple video sequences also include recordings of multiple people or objects that perform the motion in an event of interest during multiple trials to improve the breadth and accuracy of the training data. Each trial is performed by the subject while he or she faces a different direction and at different locations in the field of view of the cameras. In one training process for the system 100, the trials are performed using eight different orientations as $$0, \frac{\pi}{4}, \frac{\pi}{2}, \frac{3\pi}{4}, \pi, , \frac{5\pi}{4}, \frac{3\pi}{2}, \text{ and } \frac{7\pi}{4}$$

radians with respect to the camera.

The training process generates a model including appearance feature descriptor parameter templates and deformation parameters for one or more events c using a set of M video sequences that are each generated to depict an occurrence of the event c. For example, an event c includes a motion of a human kicking his or her leg, and the training data include M video sequences of the leg kick from one or more human training subjects that are recorded from multiple viewing angles performing the kick. The training set for a given event c is referred to as $\{D_q\}$(q=1, 2, ... M). The training process uses a scoring function $S(p_q|D_q, w^c) = \langle w^c, \Phi(D_q, p_q)\rangle$, where $w^c$ is a vector that includes all the appearance and deformation parameters that the training process refines as part of training the model, and $\Phi(D_q, p_q)$ is the corresponding appearance and deformation energy that corresponds to a particular label $p_q$.

In some surveillance system embodiments, the video monitoring process needs to not only identify a single event of interest, but identify multiple events of interest and distinguish between the different events of interest. In one embodiment, the training process uses a one-vs-all learning policy for each event of interest, and generates the model parameters that jointly detect and recognize any particular event of interest given hard negative examples of other events of interest that are generated during the training process. In one embodiment, the training process uses a support vector machine (SVM) framework that employs the following objective learning function:

$$\operatorname{argmin}_{w^c, \{\xi_q\}, \{\eta_{q,q'}\} \geq 0} \frac{1}{2}\|w^c\|^2 + \lambda_1 \sum_q \xi_q + \lambda_2 \sum_{q,q'} \eta_{q,q'}$$

$$\text{s.t. } \forall q, \langle w^c, \Phi(D_q, p_q) - \Phi(D_q, \hat{p})\rangle \geq \Delta(p_q, \hat{p}) - \xi_q$$

$$\forall q, q', \langle w^c, \Phi(D_q, p_q) - \Phi(D_{q'}, p_{q'})\rangle \geq \Delta(p_q, p_{q'}) - \eta_{q,q'}$$

In the SVM framework equations above, $\lambda_1$ and $\lambda_2$ are user defined scaling parameters that minimize slack values during optimization of the model. The constraint directed to key-frame labeling $\hat{p}$ refers to a cost penalization function, or "loss" function $\Delta(p_q, \hat{p})$ where a key-frame label $\hat{p}$ is penalized based on the observed ("ground truth") key-frame $p_q$ that is generated during the training process. The non-negative slack term $\xi_q$ provides additional robustness against violations of the constraint. The constraint directed to the ground-truth label $p_q$ implies that given any ground truth labeling $p_q$ for the qth sample of a particular motion, any ground truth labeling $p_{q'}$ of the q'th sample of any other event of interest in the training data produces a lower score after filtering through another violation accommodating hinge-loss term $\eta_{q,q'}$.

The loss function $\Delta(p_q, \hat{p})$ is used during the training process to reflect how well a particular hypothesized label $\hat{p}$ matches the predetermined ground-truth label $p_q$. In one embodiment, the loss function is a binary loss function where $\Delta(p_q, \hat{p})=1$ if $\hat{p}$ matches $p_q$ and $\Delta(p_q, \hat{p})=0$ otherwise.

The training process described above generates a model with appearance parameters and deformation parameters that can be used to classify multiple events of interest that are observed at a later time during operation of the surveillance system 100. However, the training process is susceptible to assigning higher weights for some of the motions in the events of interest, which may result in misclassification for some events of interest. The bias is estimated using the median of score data generated from the trained model using the predetermined training data as an input as set forth in the following equation: $b^c = \text{median}\{S(p_1|D_1, w^c), \ldots, S(p_M|D_M, w^c)\}$ In one embodiment, the training process estimates a bias V that is associated with different events of interest c. In the system 100, the bias data are stored in the database 106 and are used to normalize scores during an event identification process to reduce the likelihood of misclassifying an event of interest.

Figure 2:
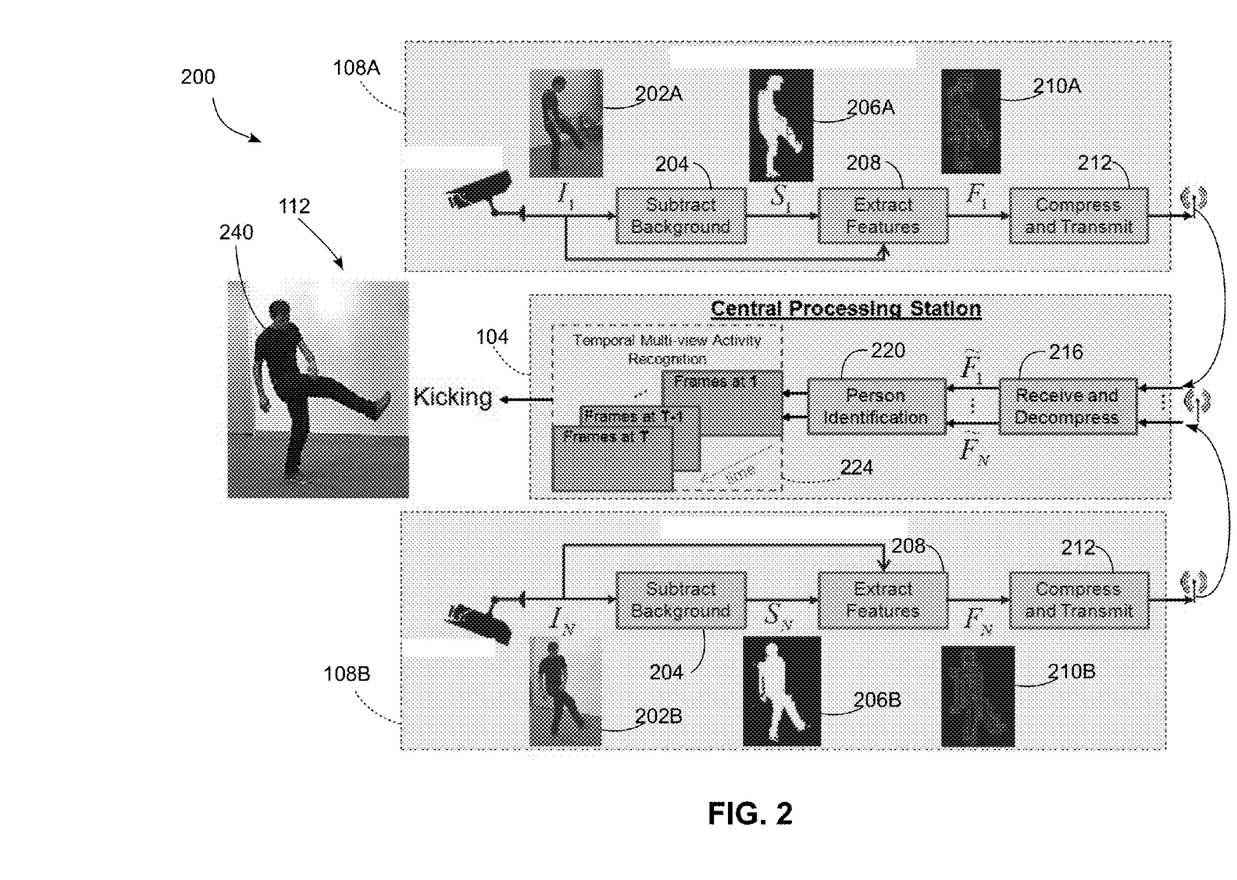
FIG. 2 is a diagram depicting a pipelined process for identification of events using metadata that are transmitted from multiple cameras viewing a scene.

FIG. 2 depicts a process 200 for operation of the surveillance system 100 for generation of feature vector data in recorded video and transmission of the feature vector data to a central processing system for identification of objects and events of interest. The process 200 takes place after the training process has generated the model parameters for the database 106 corresponding to a predetermined number of events of interest. In the description below, a reference to the process 200 performing an action or function refers to the operation of a processor, including processors in either or both of a camera and a central processing system, to execute programmed instructions to perform the action or function in conjunction with other components in the video monitoring system. The process 200 is described in conjunction with the video monitoring system 100 of FIG. 1 for illustrative purposes.

During process 200, one or more of the video cameras 108A-108N generate recorded video of the scene 112 and the feature extraction processors 144 in each camera perform background subtraction from the video image data (block 204). In FIG. 2, the cameras 108A and 108B are depicted for illustrative purposes. Each camera records video image data of the scene 112 from a different position. The cameras 108A and 108B record video, such as image frames 202A and 202B, respectively. The feature extraction processor 144 in each camera subtracts portions of the image data that correspond to the static portions of the scene 112 that do not move or change during generation of the video, such as the wall and the floor in the scene 112. The images 206A and 206B depict a human in the scene 112 with a black background that represents subtraction of the background image data in the video. The background subtraction maintains a dynamic evolving background image of the static scene. This background image evolves slowly to account for small variations in the lighting of the scene during the course of a day, or objects could be placed or removed from the scene. The dynamic background image serves as a reference image that is compared against every new image captured by the camera sensor. The feature extraction processor 144 in each of the cameras 108A and 108B identify the difference of the captured image and the reference image to extract silhouettes of one or more foreground objects. Disjoint foreground silhouettes correspond to different objects or people in the scene, and are assigned a different identification number.

Process 200 continues as feature extraction processors 144 in each of the cameras 108A and 108B extract features from the foreground objects in the image data (block 208). The intensities of the camera sensor at foreground pixel locations are extracted for each silhouette of the object after subtraction of the background, to form a foreground image for each object. The processor in each camera generates a rectangular bounding box of minimum area over the foreground image, and the processor resizes the image region to a predetermined fixed resolution. The feature extraction processor 144 generates a grid at a fixed resolution image to form each block in the grid containing the same number of pixels. The feature extraction processor 144 identifies image gradients within each grid-block and certain feature vectors are identified in a histogram of the image gradients in each grid-block. Once the individual feature vectors are identified for each block in the grid, the feature vectors are appended to each other to form one large feature vector using, for example, fixed-size array of 5×5 grids with HOG descriptors. Thus, one fixed size feature vector is identified for each foreground object in the image.

As mentioned above, the bounding box containing the foreground image is resized to generate a fixed resolution image. For example, two people of different height and size or at two different distances from the camera can be compared using the feature vectors generated from video of the scene 112. Thus, the process of extracting feature vectors on the fixed resolution foreground image provides illumination invariance, scale invariance and some rotational invariance.

Process 200 continues as each camera compresses and transmits the feature data descriptor vectors to the event processor 104 (block 212). Since the poses of people in the scene vary gradually over time, there is a high degree of correlation between their corresponding feature vectors over successive frames. The images 210A and 210B depict features in the image that the feature extraction processor in each of the cameras 108A and 108B encodes for transmission to the processing station 160. The feature extraction processors 144 in the cameras 108A and 108B perform the correlation with a compression scheme and only the small updates in the feature vectors over successive frames are compressed and transmitted. The feature extraction processors 144 use a sparse-coding framework to compress the feature vector updates. The feature extraction processors 144 periodically regenerate full feature vectors during synchronization frames of the video data to account for new objects in the scene 112 and to prevent the buildup of excessive noise errors from the sparse feature vector generation process. Advantages of performing the sparse encoding and compression include reductions to the amount of data transmitted to the event processor 104, and the correlation method tracks each individual person or moving object in the foreground, thereby enabling prediction of the path of movement for the object. Each of the cameras 108A and 108B transmits the full feature vector data for synchronization frames and sparse feature vector data in the compressed format to the network device 164 in the processing station 160 using the network devices 152 in each camera.

In one embodiment of the cameras that are used with the system 100, each of the cameras 108A and 108B transmits 800 bytes of data in a 5×5×32 array of feature descriptor data for each object that is identified in a scene during a synchronization frame that transmits full feature descriptor data. Additionally, the sparsity of the feature descriptors enables additional compression of the feature descriptor data. Thus, the cameras 108A-108B transmit only metadata to the central processing station 160 unless the central processing station 160 generates a request for full video data in response to identifying an event of interest that is viewed by one or both of the cameras 108A and 108B. In comparison, using the prior-art H.264 video compression algorithm provides an average bit rate of 64K bytes per image for 640×480 pixel resolution frames of color image data, which is roughly 2 orders of magnitude larger than the feature descriptor data.

Process 200 continues as the event processor 104 in the processing station 160 receives the compressed feature vector data from the cameras 108A and 108B, and decompresses the feature vector data (block 216). The decompression algorithm is complementary to the compression algorithm presented above if a single wireless camera is communicating with the central processing station. If more than one wireless camera is transmitting data to the central processing station, then a joint decompression scheme is implemented that uses information from one camera to predict the updates for other cameras. During joint decompression, the processing station 160 reconstructs the full feature vector from multiple sparse feature vectors that are generated by two or more of the cameras for an object in the scene 112. The joint decompression scheme minimizes the error in decompression, when compared to independent decoding of the separate data from each of the cameras.

Process 200 continues with identification of a person or object in the decompressed feature vector data from the cameras (block 220). In one operating mode, the monitoring system 100 is configured to identify feature vectors that correspond to humans and monitor motions of the humans. Other embodiments are configured to identify the motion of other objects, including motor vehicles or animals other than humans in different configurations. Some foreground feature vectors might correspond to people while others could correspond to other objects (such as cars, animals, bicycles, etc.). The feature and event database 106 stores sets of feature vectors that correspond to humans and are generated during a training process for the video monitoring system 100. The event processor 104 filters the feature vectors corresponding to humans in the scene 112 from the other objects using the predetermined training data in the database 106. In one embodiment, the process of filtering objects to identify humans is performed using an object classifier.

In some embodiments of the process 200, the event processor 104 is configured to identify particular events that occur when an identified object, such as a human, performs a motion from the metadata received from the cameras 108A-108N. In the illustrative embodiment of FIG. 2, the video data include a plurality of frames in which a person 240 in the scene 112 performs a kick. The processor 104 performs event recognition of the kick event using the feature vectors that are received from both cameras 108A and 108B over a predetermined time period. The event recognition process is temporal, since the event occurs over time in multiple feature vectors corresponding to multiple frames of video data, and is multi-view because the feature vectors from multiple cameras record the event from different positions. The event recognition process recognizes events from the activities of one or more people even if the events are recorded in different parts of the image, oriented in different directions, and if the events are performed at different rates. Further, the processor identifies the events in real time with reference to all the predetermined events that are stored in the database 106. If an event of interest is identified, the event processor 104 generates an alert to prompt a human operator to review the event. The processor 104 receives video of the event from one or more of the cameras 108 to provide video playback of the event to the human operator. The processor 104 optionally generates a classification of the event for the human operator to review in addition to viewing the video data. For example, in the example of FIG. 2, the event processor 104 generates an alert indicating that a person has performed a kick (block 224), and optionally generates a request for video of the event for display through the video output device 168 for review by human operators.

As described above, the system 100 includes the trained object features and event database 106 that stores feature vector data that are identified for a plurality of events of interest during a training process. Using the kick event of FIG. 2 as an example, the database 106 stores feature vectors that are generated from video recordings of one or more people performing kicks during a training process. The recordings of the kicks are referred to as "exemplars," and the exemplars are typically termed "training data" in the computer vision and machine learning communities. Sufficient training data is recorded for each event of category of interest. For example, in one embodiment a training process collects data of multiple subjects performing each of the events of interest over multiple trials.

During the training process, some image frames of the event are selected as key-frames. For each motion, a predetermined number of key-frames, such as six key-frames, are selected manually from the video data of each trial. The key-frames represent the pose/gesture frames that provide maximum information regarding the motion being performed. A feature vector is extracted for the person in each key-frame using the sub-systems using the same methods that are described above for feature vector extraction in the process 200. The key-frame feature vectors form the training database. In the system 100, the dictionary of events that is generated from the training data is stored with the trained object features and event database 106.

During the video monitoring process, each feature vector corresponding to a motion of a single person is compared to the feature vectors that are stored in the event database 106. Two feature vectors, however, might be very similar for single frames of two different motions. For instance, a single frame of a person walking might be indistinguishable from a single frame of a person running. Thus, the feature vectors of query image sequences are compared with the key-frame sequences for each motion in order to remove ambiguity regarding the motion that is recorded by the monitoring system. Further, the information from multiple cameras needs to be fused to remove ambiguity from the feature vector that are generated by multiple cameras in different locations because some motions can be invisible to some camera views due to occlusions. For instance, one arm of a person who is oriented perpendicular to the camera is invisible to this camera, and thus another camera facing the same person would capture his occluded arm.

In the system 100, the event processor 104 in the processing station 160 uses a graphical model for each event of interest to identify the events over both time and from multiple viewing angles. The graphical model formulation is a probabilistic model that captures the interaction between multiple key-frames, across multiple camera views. In one embodiment, the model includes M key-frames and N camera views, for a total of N×M nodes in the graph. Different configurations of the graph include multiple arrangements of connections between nodes. Each choice of connections has different properties for the identification of events. The edges of the graphs encode the time difference between the key-frames for that motion in the temporal edges, and the spatial distance of the foreground object bounding box along the spatial edges.

Figure 3:
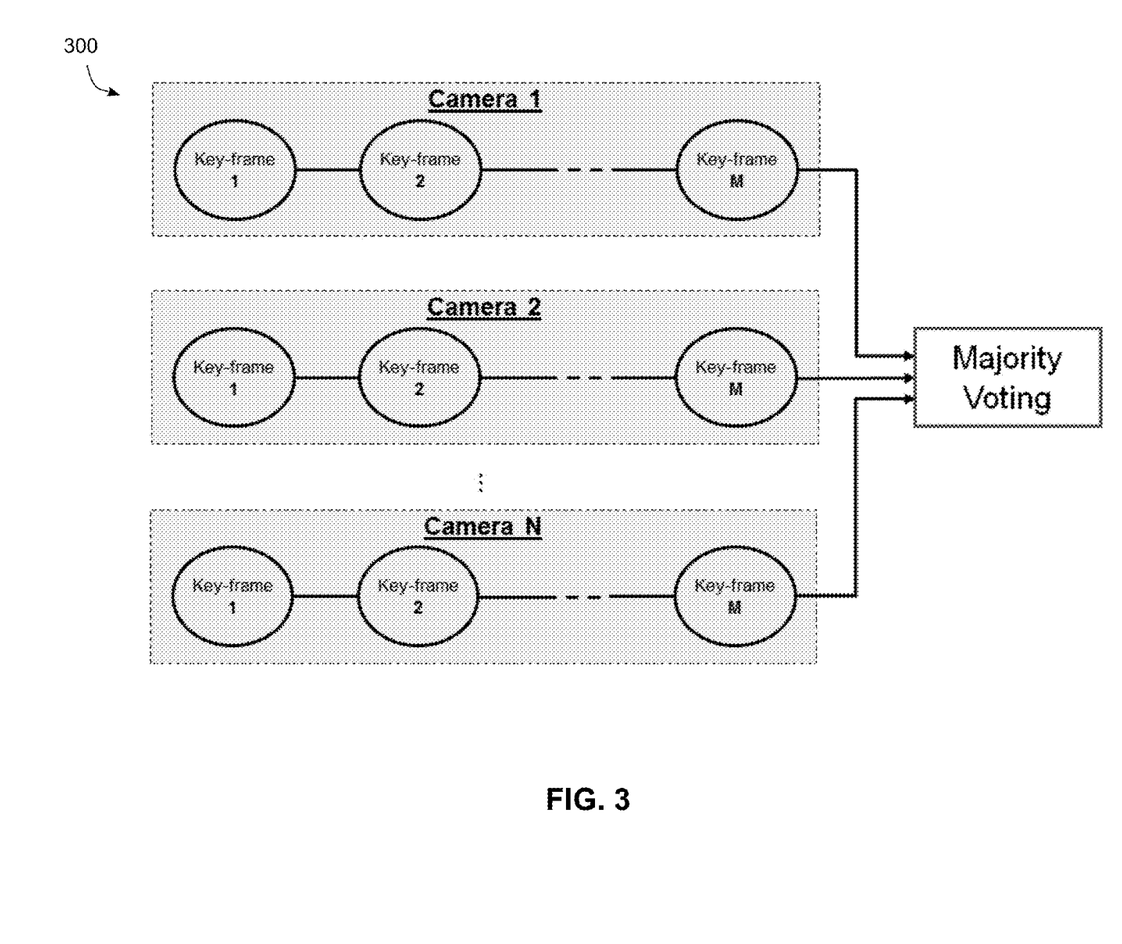
FIG. 3 is a diagram of a graph of feature vector nodes for an event that are generated from multiple cameras in a majority-voting configuration.

FIG. 3 depicts one arrangement of nodes in a graph 300 for identifying events using a majority voting model. In the majority voting model, only the nodes corresponding to each of the cameras are connected together linearly over time. Thus, the graph 300 of FIG. 3 includes one chain for each camera that observes the event. The inference of the probability of occurrence of any event is performed independently for each chain using a standard method like dynamic programming. Each camera is assigned the same weight in determining if a particular event has been observed in the configuration of FIG. 3. In the system 100, the event processor 104 receives the feature vector data from the cameras 108A-108N and identifies if the feature vector graphs from each camera form a majority indicating that an event has been observed. If the feature vectors graphs from the majority of cameras do not agree that an event has occurred, the event processor 104 identifies that no event has occurred (non-occurrence of the event) and does not request full video from the cameras.

In FIG. 3, the nodes for each camera correspond to key-frames that are identified by the cameras are formed as a separate sub-graph. A video sequence of frames is represented as D and any particular event of interest is represented as directed graph G, where each node is a key-frame for the event of interest. The graph G is represented by a collection of nodes V connected by edges E. The number of the V nodes is expressed as M. Within the graph, any given node $i \in \{1 \ldots M\}$ has an anchor position $p_i=(x_i,y_i,t_i)$ where $(x_i,y_i)$ represents the pixel location in the center of the bounding box that is generated around the object in the image and $t_i$ represents the frame number in the video sequence, which acts as a time reference for when the frame was generated. The edges E in the graph specify which pairs of key-frame nodes are constrained to have relations. For example, in FIG. 3 the nodes for each camera are connected to each other by edges in a chain corresponding to a time-based sequence of key-frames that correspond to a particular event of interest, with the key-frames occurring in predetermined sequence. In other embodiments, the framework is more general and edges in the graph need not be successive. For example, some events can include a variable number of repetitions for a particular motion. The graph optionally includes jump edges that form cycles between key-frames for the motion that is repeated one or more times.

In some embodiments, the event processor 104 identifies key-frames and changes of the feature descriptors for an object between key-frames using a deformable key-frame model. In FIG. 3, the event processor 104 generates a score that corresponds to the likelihood that each graph each graph generates a score $$S(p|D,w) = \Sigma_{i \in V} <w_i, \phi^{app}(D,p_i)> + \Sigma_{i,j \in E} <w_{ij}, \phi^{def}(p_i,p_j)>$$

where $\phi^{app}(D,p_i)$ is an HOG or other feature descriptor for an object that is detected at a frame time $t_i$, and $\phi^{def}(p_i,p_j)$ models deformation of the object between pairs of frames (frames i and j) based on the changes in the feature descriptor metadata that are received from one or more of the cameras. For a series of image frames that are generated by a single camera, the deformation is expressed as: $\phi^{def}(p_i,p_j)$ =[dx; $dx^2$; dy; $dy^2$; dt; $dt^2$] where $dx=x_i-x_j$, (change in x position) $dy=y_i-y_j$ (change in y position), and $dt=t_i-t_j$ (change in time). To match the feature vectors for a frame of video to a template w, in the dictionary of the database 106, the event processor 104 identifies a maximum inner product response with the feature vectors at the location $p_i$ of the in the video D. A deformation weight $w_{ij}$ between two frames models the Mahalanobis distance between the pairs of key-frames over time in the model. The parameters for the Mahalanobis distance are generated during the training of the model and are stored in the database 106.

Figure 4:
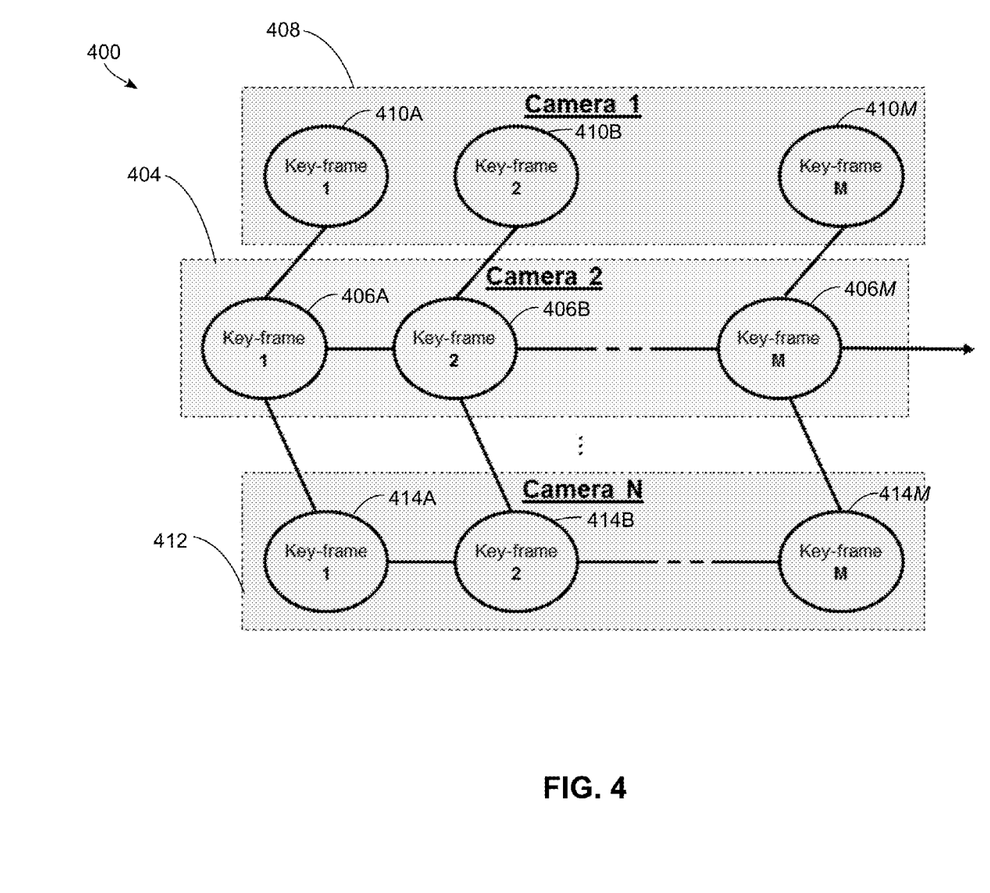
FIG. 4 is a diagram of a graph of feature vector nodes for an event that are generated from multiple cameras in a multi-chain configuration.

FIG. 4 depicts another graph configuration 400 where one camera acts as a root node that is connected across time to the key-frames that are generated by other cameras in the system 100. All other camera views are connected to the nodes from the selected camera as shown in FIG. 4. The inference in this case is also done using dynamic programming. The configuration of FIG. 4 is referred to as a multi-view chain graphical model. In the example of FIG. 4, the camera 2 is selected as the root node. In FIG. 4 the camera 404 is selected as the reference camera. In one embodiment, the system 100 uses a single camera as the reference camera, such as a system in which a single camera has higher resolution than the other cameras or for a camera that is positioned in a certain location to identify events in the scene with fewer obstructions than other cameras in the system 100. In another embodiment, the system 100 assigns the reference camera dynamically based on the camera that detects a key-frame in an event prior to the other cameras that view the scene. Thus, the reference camera for one event of interest can be different than the reference camera for another event of interest in the system 100. The camera 404 views an event and generates key-frames for the event, such as key-frames 406A-406M. The cameras 408 and 412 generate additional image data for key-frames of the event, such as key-frames 410A-410M and 414A-414M, respectively.

As depicted in FIG. 4, each of the cameras generates key-frames from an event, but the cameras do not necessarily generate the key-frames at the same time. For example, in FIG. 4 the reference camera 404 generates the key-frame 406B earlier than the corresponding key-frames 410B and 414B from cameras 410 and 412, respectively. The event processor 104 receives the feature data corresponding to each of these key-frames from the cameras and identifies that the key-frames 410B and 414B correspond to the key-frame 406B from the reference camera 404, even though the key-frames are not generated at exactly the same time. In one embodiment, the event processor 104 applies a temporal constraint to the frames, which is to say that the event processor 104 identifies that key-frames from different cameras correspond to different views of the same event when the key-frames occur within a comparatively short time period of one another. For example, in one embodiment the event processor 104 applies a temporal-weighted scale to key-frames that are generated by the other cameras to identify the likelihood that the key-frames correspond to the same portion of the same event of interest as a key-frame from the reference camera. For example, if the key-frame 410B occurs within 100 milliseconds of the key-frame 406B, then the weighted scale assigns a high probability (e.g. 90%) that the two key-frames correspond to each other, while a longer delay of 1 second has a correspondingly lower probability (e.g. 25%) that the two key-frames correspond to one another.

In one embodiment, the event processor 104 extends the score identification process that is described for single cameras in FIG. 3 to multiple cameras including the reference camera and one or more additional cameras that view an event. The graph of FIG. 4 depicts the nodes as key-frames with directed edges that connect the nodes 404A-404N for series of key-frames from the reference camera 404. The graph 400 also includes edges that connect the key-frame nodes from the non-reference cameras 408 and 412 are connected to the corresponding key-frames in the reference camera. As described above, the event processor 104 identifies the edge connections between key-frames from the different cameras based on the proximity in time between the detection of each of the key-frames from the different cameras that record the same event.

In the multi-camera configuration of FIG. 4 the event processor 104 generates scores S(p|D,w) in a similar manner to the single-camera configurations that are depicted in FIG. 3. The deformation function $\phi^{def}$, however, changes when key-frame data from multiple cameras are used to generate the score. To model deformation between key-frames from cameras that record an object in a scene from multiple angles and locations, the event processor 104 uses a fixed or "homographic" feature in the scene that is visible to each of the cameras. For example, in many surveillance system configurations all of the cameras have a view of a single ground plane in the scene. The ground plane does not necessarily need to be the physical ground on which people walk, but is instead a common geometric plane that serves as a reference point for identifying an object and event when the object is viewed from different angles and locations. The event processor 104 identifies the homography $H_l^r$ for a common ground plane between the reference camera r and any of the other cameras l that view the ground plane. The homography is a linear transformation that maps pixels, and correspondingly features, in one view of a plane to another, and the event processor 104 uses the homography to identify the distance between objects in the views of different cameras. Additionally, when the event processor 104 identifies the motions of humans who typically are in contact with the ground plane, the center of the line connecting the bottom corners of the bounding boxes that are formed around the objects in each scene act as a proxy for the 3D location of the objects in the scene. Thus, the event processor 104 can identify the locations of the same object viewed from different cameras in situations where the ground plane or other homographic elements is within the view of the different cameras and the object remains proximate to the homographic element. In the surveillance system 100, the multiple cameras maintain a view of the common ground plane and objects on the ground plane for the event processor 104 to identify the positions of objects in the views of the different cameras using the homographic transformation.

Figure 6:
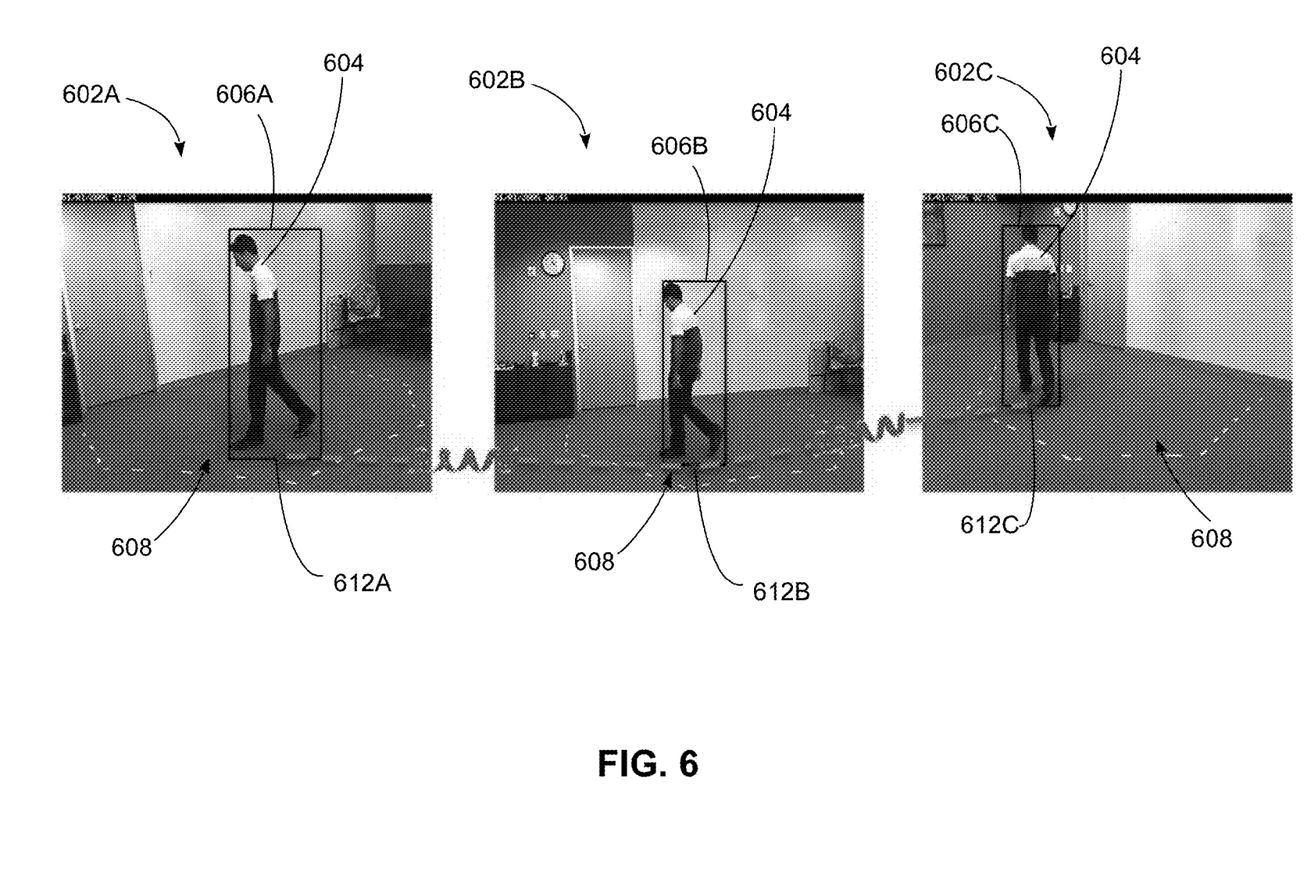
FIG. 6 is a set of images of a scene generated by multiple cameras in a surveillance system.

Given the homogeneous coordinates of a pixel, $f^l=(x^l,y^l,1)^T$ on the ground plane in the view of camera l, the position of the pixel to the reference camera r is estimated as $f^r=H_l^r f^l$. The deformation function for the two views is defined as: $\phi^{def}(f_i^l,f_i^r)=[dx; dx^2; dy; dy^2]$ where $[dx, dy]=(f^r-H_l^r f^l)^T$. In one embodiment, the deformation function is modeled as a spring function where the cost to perform a deformation corresponds to an amount of force required to stretch a spring. FIG. 6 depicts a graphical representation of the deformation constraints between different views 602A, 602B, and 602C of the same person (person 604) in a scene with a common ground plane 608 that is visible to three different cameras. The event processor 104 identifies corresponding locations 612A-612C at the bottom center of bounding boxes 606A-606C in the feature descriptor data corresponding to each of the views 602A-602C, respectively. The bounding box locations 612A-612C are each in contact with the ground plane 608 for the homographic transformation.

Figure 5:
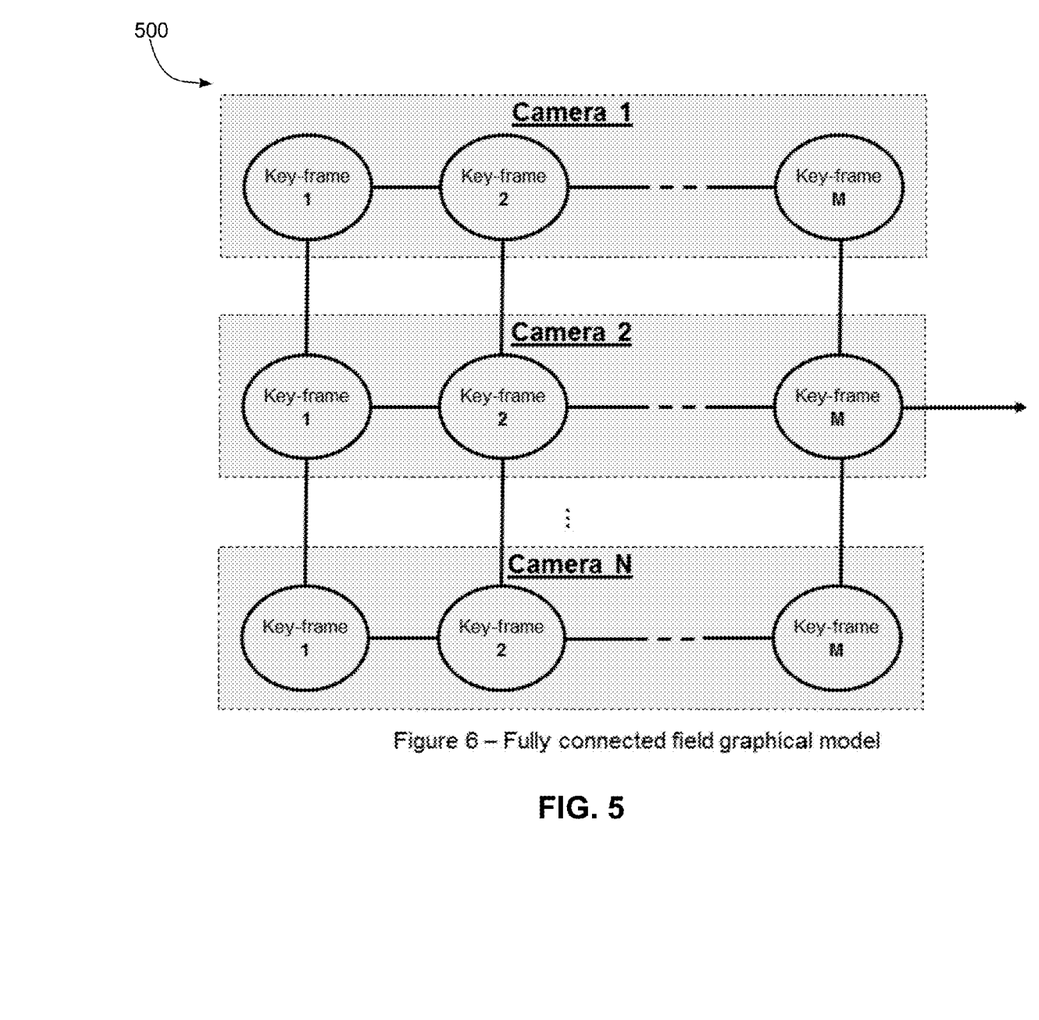
FIG. 5 is a diagram of a graph of feature vector nodes for an event that are generated from multiple cameras in a multi-view field configuration.

FIG. 5 depicts another graph 500 where the key-frames that are generated from each of the cameras are connected together. In the framework of FIG. 5, every node is connected to its neighbor across space and time as shown in FIG. 5. Inference for this model can be done using iterated dynamic programming, with multiple spatial iterations interspersed between temporal iterations. In one configuration, the event processor 104 processes the graph FIG. 5 as a set of graphs similar to FIG. 4 where each camera is treated as the reference camera during one iteration of the processing of the graph 500. The event processor 104 subsequently combines the scores for the different iterations through the graph 500 to identify the most likely event that corresponds to the key-frames from the different cameras. The number of iterations is fixed a priori in one embodiment. The configuration of FIG. 5 is referred to as a multi-view field where the nodes corresponding to all cameras are connected together.

During the process 200 the central processing station 160 uses the graphical models described above to process detected key-frames in the feature vector metadata from the cameras 108A and 108B using the event processor 104 and the predetermined models in the database 106 to identify particular events of interest, such as the kicking event depicted in FIG. 2, and to take an action in response to identifying the event of interest. The event processor 104 performs an inference operation to identify a "best" event c* and corresponding label p* from the predetermined set of events of interest in the database 106. The "best" event c* refers to the event that has the highest likelihood of occurrence and corresponding non-occurrence of other events given the observed sequences of key-frame metadata from the cameras. The label p* refers to a human or machine readable identifier that is associated with the event c* that is determined during the training process and is stored in the database 106. The event processor 104 identifies c* and p* by maximizing the score function as set forth in the following equation: $\{c^*, p^*\}=\mathrm{argmax}_{p,c\in\{1\ldots C\}}(S(p|D,w^c)-b^c)$, where $w^c$ is the template stored in the database 106 for one of the events c, and $b^c$ is the bias factor generated during the training process that is subtracted from the raw score to account for bias during the model training process.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A surveillance system comprising:
   a plurality of cameras located in a plurality of positions to record a scene, each camera further comprising:
      a sensor configured to generate video data of the scene comprising a series of frames;
      a first network device configured to transmit the video data and feature vectors associated with the video data to a processing station; and
      a feature extraction processor operatively connected to the sensor and the network device, the feature extraction processor being configured to:
         identify a plurality of feature vectors in video data generated by the sensor, the plurality of feature vectors including a first feature vector for a first frame in the video data and a second feature vector for a second frame in the video data, the second frame occurring after the first frame;
         transmit only the plurality of feature vectors to the processing station with the first network device in a first operating mode including transmission of the first feature vector and a sparse feature vector corresponding to only a portion of the second feature vector that is different than the first feature vector; and
         transmit the video data to the processing station with the first network device in a second operating mode only in response to a request for the video data from the processing station; and
   the processing station further comprising:
      a second network device;
      a video output device; and
      a processor operatively connected to the second network device and the video output device, the processor being configured to:
         receive the plurality of feature vectors generated by each camera in the plurality of cameras with the second network device;
         identify an object and motion of the object in the scene with reference to the plurality of feature vectors received from at least two of the plurality of cameras;
         identify a event of interest corresponding to the motion of the object in the scene with reference to a predetermined database of events only in response to;
         generate a request for transmission of the video data from at least one camera in the plurality of cameras for only; and
         generate a graphical display of the video data from the at least one camera with the video output device to display the object associated with the event.

2. The surveillance system of claim 1, feature extraction processor in each of the plurality of cameras being further configured to:
   identify a portion of one frame in the video data that corresponds to a background of the scene; and
   identify the plurality of features in the video data only in portions of the one frame that do not correspond to the background of the scene.

3. The surveillance system of claim 2, the feature extraction processor in each camera being further configured to:
   generate a bounding box corresponding a portion of the one frame that does not correspond to the background of the scene;
   resize the portion of the one frame in the bounding box to a generate a fixed resolution image of the portion of the one frame included in the bounding box; and
   identify at least one feature vector in the plurality of feature vectors with reference to the fixed resolution image.

4. The surveillance system of claim 3, the feature extraction processor being further configured to:
   identify a plurality of image gradients in the fixed resolution image; and
   generate the feature vector including a histogram of gradients corresponding to the plurality of image gradients.

5. The surveillance system of claim 1, the processor in the processing station being further configured to:
   receive another sparse feature vector from a second camera in the plurality of cameras, the other sparse feature vector including only portions of a feature vector generated in the second camera that have changed since generation of an earlier feature vector, the earlier feature vector being generated approximately concurrently to the first feature vector from the first camera; and
   generate a full feature vector corresponding to the other sparse feature vector from the second camera with reference to the first feature vector from the first camera.

6. The surveillance system of claim 1, the processor in the processing station being further configured to:
   identify occurrence or non-occurrence of an event in each plurality of feature vectors from each of the plurality of cameras individually with reference to the plurality of feature vectors corresponding to a plurality of key-frames from each of the plurality of cameras corresponding to the motion of the object during a single time period;
identify the event in response to an identification of an occurrence of the event from a majority of the plurality of cameras.

7. The surveillance system of claim 1, the processor in the processing station being further configured to:
receive a first plurality of feature vectors from a first camera corresponding to a first frame of video data;
identify that the first plurality of feature vectors from the first camera correspond to a first key-frame for an event in the predetermined database of events;
receive a second plurality of feature vectors from a second camera corresponding to a second frame of video data; and
identify that the second plurality of feature vectors from the second camera correspond to a second key-frame from the event; and
generate a score corresponding to a deformation between the first plurality of feature vectors in the first frame and the second plurality of feature vectors in the second frame; and
identify occurrence or non-occurrence of the event with reference to the score.

8. The surveillance system of claim 7, the processor in the processing station being further configured to:
identify a first location of an object corresponding to the first plurality of feature vectors that are extracted from the first frame of video data;
identify a second location of the object corresponding to the second plurality of feature vectors that are extracted from the second frame of video data;
perform a homographic transformation to identify a distance between the first location of the object and the second location of the object with reference to a ground plane that is present in both the first frame of video data and the second frame of video data; and
generate the score corresponding to the deformation between the first plurality of feature vectors in the first frame and the second plurality of feature vectors in the second frame with reference to the distance between the first location and the second location.

9. A method for surveillance of a scene comprising:
generating with a sensor in a first camera first video data of the scene, the first video data comprising a first series of frames;
identifying with a feature extraction processor in the first camera a first plurality of feature vectors in the first video data including a first feature vector for a first frame in the video data and a second feature vector for a second frame in the video data, the second frame occurring after the first frame;
transmitting with a network device in the first camera only the first plurality of feature vectors to a processing station in a first operating mode, the transmitting including the first feature vector and a sparse feature vector corresponding to only a portion of the second feature vector that is different than the first feature vector;
transmitting with the network device in the first camera the first video data to the processing station in a second operating mode only in response to a request for the first video data from the processing station;
generating with another sensor in a second camera second video data of the scene, the second video data comprising a second series of frames and the second camera generating the second video data of the scene from a different position than the first camera;
identifying with another feature extraction processor in the second camera a second plurality of feature vectors in the second video data;
transmitting with another network device in the second camera only the second plurality of feature vectors to the processing station in the first operating mode;
transmitting with the other network device in the second camera the second video data to the processing station in the second operating mode only in response to a request for the second video data from the processing station;
receiving with another network device in the processing station the first plurality of feature vectors from the first camera and the second plurality of feature vectors from the second camera;
identifying with an event processor in the processing station an object and motion of the object in the scene with reference to the first and second plurality of feature vectors;
identifying with the event processor in the processing station an event corresponding to the motion of the object in the scene with reference to a predetermined database of events;
generating with the event processor in the processing station a request for transmission of the video data from at least one of the first camera and the second camera; and
generating with a video display device a graphical display of video data received from at least one of the first camera and the second camera with the video output device to display the object associated with the event.

10. The method of claim 9 further comprising:
identifying with the feature extraction processor in the first camera a portion of one frame in the first video data that corresponds to a background of the scene; and
identifying with the feature extraction processor in the first camera the first plurality of features in the first video data only in portions of the one frame that do not correspond to the background of the scene.

11. The method of claim 10 further comprising:
generating with the feature extraction processor in the first camera a bounding box corresponding a portion of the one frame that does not correspond to the background of the scene;
resizing with the feature extraction processor in the first camera the portion of the one frame in the bounding box to a generate a fixed resolution image of the portion of the frame included in the bounding box; and
identifying with the feature extraction processor in the first camera at least one feature vector in the first plurality of feature vectors with reference to the fixed resolution image.

12. The method of claim 11, the identification of the at least one feature vector further comprising:
identifying with the feature extraction processor in the first camera a plurality of image gradients in the fixed resolution image; and
generating with the feature extraction processor in the first camera the at least one feature vector including a histogram of gradients corresponding to the plurality of image gradients.

13. The method of claim 9 further comprising:
receiving with the event processor in the processing station another sparse feature vector from the second camera, the other sparse feature vector including only portions of a feature vector generated in the second camera that have changed since generation of an earlier feature vector in the second camera, the earlier feature vector being generated approximately concurrently to the first feature vector from the first camera; and generating with the event processor in the processing station a full feature vector corresponding to the other sparse feature vector from the second camera with reference to the first feature vector from the first camera.

14. The method of claim 9, the identification of the event further comprising:

identifying with the event processor in the processing station occurrence or non-occurrence of an event in the first plurality of feature vectors and the second plurality of feature vectors individually with reference to the first plurality of feature vectors corresponding to a plurality of key-frames and the second plurality of feature vectors corresponding to the plurality of key-frames corresponding to the motion of the object during a single time period;

identify the event in response to an identification of an occurrence of the event from one or both of the first camera and second camera.

15. The method of claim 9, the identification of the event further comprising:

receiving with the event processor in the processing station the first plurality of feature vectors from the first camera corresponding to a first frame of the first video data;

identifying with the event processor that the first plurality of feature vectors correspond to a first key-frame for an event in the predetermined database of events;

receiving with the event processor the second plurality of feature vectors from the second camera corresponding to a second frame of the second video data; and identifying with the event processor that the second plurality of feature vectors correspond to a second key-frame for the event; and generating with the event processor in the processing station a score corresponding to a deformation between the first plurality of feature vectors in the first frame and the second plurality of feature vectors in the second frame; and identifying with the event processor in the processing station occurrence or non-occurrence of the event with reference to the score.

16. The method of claim 15, the generation of the score further comprising: identifying with the event processor in the processing station a first location of an object corresponding to the first plurality of feature vectors that are extracted from the first frame of video data;

identifying with the event processor in the processing station a second location of the object corresponding to the second plurality of feature vectors that are extracted from the second frame of video data;

performing with the event processor in the processing station a homographic transformation to identify a distance between the first location of the object and the second location of the object with reference to a ground plane that is present in both the first frame of video data and the second frame of video data; and generating with the event processor in the processing station the score corresponding to the deformation between the first plurality of feature vectors in the first frame and the second plurality of feature vectors in the second frame with reference to the distance between the first location and the second location.

* * * * *